United States Patent
Bastani et al.

(10) Patent No.: US 12,340,549 B2
(45) Date of Patent: Jun. 24, 2025

(54) OBJECT DETECTION

(71) Applicant: Telefonaktiebolaget LM Ericsson (publ), Stockholm (SE)

(72) Inventors: Saeed Bastani, Dalby (SE); Héctor Caltenco, Oxie (SE); Alexander Hunt, Tygelsjö (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 887 days.

(21) Appl. No.: 17/613,059

(22) PCT Filed: May 28, 2019

(86) PCT No.: PCT/EP2019/063818
§ 371 (c)(1),
(2) Date: Nov. 20, 2021

(87) PCT Pub. No.: WO2020/239204
PCT Pub. Date: Dec. 3, 2020

(65) Prior Publication Data
US 2022/0222923 A1    Jul. 14, 2022

(51) Int. Cl.
*G06V 10/25*     (2022.01)
*G06T 7/80*      (2017.01)
(Continued)

(52) U.S. Cl.
CPC .......... *G06V 10/25* (2022.01); *G06T 7/80* (2017.01); *G06V 10/10* (2022.01); *G06V 10/765* (2022.01);
(Continued)

(58) Field of Classification Search
CPC ...... G06V 10/25; G06V 10/10; G06V 10/765; G06V 10/82; G06V 2201/06; G06V 2201/07; G06T 7/80
See application file for complete search history.

(56) References Cited

U.S. PATENT DOCUMENTS 8,055,029 B2 * 11/2011 Petrescu ............ G06V 30/2504
382/118
10,424,116 B2 * 9/2019 Kim ........................ G06F 3/017
(Continued)

FOREIGN PATENT DOCUMENTS

CN    108460395 A     8/2018
EP    3287949 B1 *   7/2020   ........... G06K 9/0063

OTHER PUBLICATIONS

Kamenicky et al., 2016, "PIZZARO: Forensic analysis and restoration of image and video data" (pp. 153-166). (Year: 2016).*
(Continued)

*Primary Examiner* — Manav Seth
(74) *Attorney, Agent, or Firm* — Leffler Intellectual Property Law, PLLC (57) ABSTRACT

An object detection device has a controller configured to receive classification data and regions for an image. The regions are prioritized and if a region is selected for further prediction, a photographic feature for the selected region is determined and a re-capture of the selected region is made based on the photographic feature by updating an image capturing device. The re-captured region is re-processed and classification data is re-generated. Then, final object detection for selected region(s) is performed and final object detection for not-selected region(s) is performed.

18 Claims, 5 Drawing Sheets

(51) Int. Cl.
  *G06V 10/10* (2022.01)
  *G06V 10/764* (2022.01)
  *G06V 10/82* (2022.01)

(52) U.S. Cl.
  CPC .......... *G06V 10/82* (2022.01); *G06V 2201/06* (2022.01); *G06V 2201/07* (2022.01)

(56) References Cited

U.S. PATENT DOCUMENTS

| | | | | |
|---|---|---|---|---|
| 10,635,926 | B2* | 4/2020 | Hara | G06N 3/08 |
| 10,769,466 | B2* | 9/2020 | Britto Mattos Lima | G06V 10/764 |
| 11,227,384 | B2* | 1/2022 | Kashyap | G16H 30/00 |
| 2004/0218804 | A1* | 11/2004 | Affleck | G02B 21/0016 |
| | | | | 382/141 |
| 2006/0159325 | A1* | 7/2006 | Zeineh | G16H 10/20 |
| | | | | 382/128 |
| 2006/0159367 | A1* | 7/2006 | Zeineh | G02B 21/365 |
| | | | | 382/128 |
| 2016/0065861 | A1 | 3/2016 | Steinberg et al. | |
| 2016/0284095 | A1 | 9/2016 | Chalom et al. | |
| 2017/0250751 | A1 | 8/2017 | Kargieman et al. | |
| 2018/0220061 | A1 | 8/2018 | Wang et al. | |
| 2018/0300880 | A1 | 10/2018 | Fan et al. | |
| 2018/0330165 | A1 | 11/2018 | Halligan et al. | |
| 2018/0373934 | A1* | 12/2018 | Bridges | G06F 18/285 |
| 2018/0374216 | A1* | 12/2018 | Hu | G06T 7/75 |
| 2022/0222822 | A1* | 7/2022 | Amthor | G06T 5/70 |
| 2024/0013431 | A1* | 1/2024 | Goldberg | H04N 23/611 |

OTHER PUBLICATIONS

PCT International Search Report, mailed Feb. 6, 2020, in connection with International Application No. PCT/EP2019/063818, all pages.
PCT Written Opinion, mailed Feb. 6, 2020, in connection with International Application No. PCT/EP2019/063818, all pages.
Mingfei Gao et al., "Dynamic Zoom-in Network for Fast Object Detection in Large Images", arXiv:1711.05187v2 [cs.CV] Mar. 27, 2018, 10 pages.

* cited by examiner

OBJECT DETECTION

TECHNICAL FIELD

The present invention relates to an object detection device and a method, and in particular to an object detection device and a method for improved object detection utilizing camera feedback.

BACKGROUND

Object detection is a computer technology related to computer vision and image processing that deals with detecting instances of semantic objects of certain classes (such as humans, buildings, or cars) in digital images and videos. Well-researched domains of object detection include face or pose detection for detecting humans and automotive related object detection (pedestrian, cars, lanes, signs, etc.). Object detection has applications in many areas of computer vision, including image retrieval, industrial use, robotic vision and video surveillance, however, in this application focus will be on object detection in mixed or augmented reality systems.

Furthermore, virtual reality (VR) systems are growing in popularity. Similarly so-called mixed or augmented reality systems are also growing in popularity. In contrast to virtual reality systems, where everything is virtual, augmented reality systems are based on a real world view onto which virtual content is displayed. A user is thus presented with a real world view of real life objects and the view is augmented with virtual objects or contents providing functionality and/or information. A very popular example is the game Pokemon Go™ where a user looks at his smartphone screen on which a video capture of the current camera view is shown. On to this camera view certain symbols and "monsters" are displayed as virtual objects enabling the user to see information and "monsters" that is hidden to the naked eye and to go hunt for the "monsters". Pokemon Go™ is an example of Video See-Through, where a camera captures what is behind a smartphone and this is displayed on the smartphone's display overlaid with virtual content.

Similarly, in optical see-through (OST) systems the user is not presented with a camera capture, but the user actually sees through a device and looks at the real life world directly. The user will thus be presented with two views overlapping each other, one where virtual content is provided and one where the real-life objects are provided. In contrast, in a virtual system the user would be presented with one view where both the real-life objects and the virtual content is displayed.

In order to achieve the collaboration between the virtual content and the real-life objects, the real-life objects must be detected.

Methods for object detection generally fall into either classic machine learning-based approaches or deep learning-based approaches. For Machine Learning approaches, it becomes necessary to first define features, then using a technique such as support vector machine (SVM) to do the classification. On the other hand, deep learning techniques that are able to do end-to-end object detection without specifically defining features, and are typically based on convolutional neural networks (CNN).

The multi-task nature of object detection has made it a challenging task. For this reason, the existing solutions achieve far below human accuracy even for simple tasks (such as Pascal VOC dataset), let alone their huge decline in accuracy for difficult tasks, such as objects in context (MS COCO, for instance). Extending these solutions for further improvement of accuracy entails a significant increase in model size, and thus increased resource consumption (power, memory, processing). This issue is even more pronounced when hard-to-recognize objects are present in the image (e.g., small objects, blurry objects, etc.). There is thus a need for high accuracy object detection that can be realized without or with only a negligible increase in model complexity (e.g. computations, memory, and energy usage).

Some prior art systems utilize a two-step approach where an image is first analyzed on a high level (using a coarse grain) in order to analyze regions of interest, which are later analyzed on a detailed level (fine grain) for object detection. This saves on processing power in that only some regions are analyzed on a detailed level which is necessary for object detection.

However, this does not solve problems, when objects are difficult to detect.

The inventors have realized a problem that exist in contemporary inference pipeline, namely that the inference is one-way, that is, little or no feedback is used from the object detection model to modify the settings of the image/video capturing device to produce a desired accuracy.

As the inventors have realized, there is thus a need for a device and a method for providing a manner of detecting objects that does not require vast processing resources nor an increase in object model, while still allowing for a higher accuracy of object detection and which is able to overcome gross photographic errors.

SUMMARY

An object of the present teachings is to overcome or at least reduce or mitigate the problems discussed in the background section.

According to one aspect an object detection device is provided, the object detection device comprising a controller configured to:
  a) receive classification data and regions for an image;
  b) prioritize the regions;
  c) determine if a region is selected for further prediction; and if so
    d) determine a photographic feature for the selected region;
    e) cause a re-capture of the selected region based on the photographic feature by updating an image capturing device;
    f) re-process the re-captured region; and
    g) re-generate classification data; and further
  h1) perform final object detection for selected region(s) and
  h2) perform final object detection for not-selected region(s).

This has the benefit that the solution may be implemented as software-based, and thus flexible (assuming camera firmware allows feature manipulation via software, like iOS and Android APIs do). The teachings herein increases object detection accuracy with minimal computational overhead because it relies foremost on the available camera capabilities.

The solution may also be implemented as a hardware solution or a mix of software and hardware components.

The teachings herein does not force any modification to the object detection model architecture. Thus, the scope of use is potentially high. And the teachings herein are forward-compatible because it can take advantage of not only the existing features in cameras but also the ones that emerge in future. Basically, any camera feature that has to do with some form of local or regional manipulation will add to the merits of the teachings herein.

In one embodiment the controller is further configured to perform object detection for the image utilizing an object detection model. In one embodiment the object detection model is based on a Deep Neural Network model.

In one embodiment the controller is further configured to a) receive classification data and regions for the image by receiving the image and process the image generating the classification data and partition the image into regions.

In one embodiment the controller is further configured to determine the photographic feature by determining a photographic shortcoming of the region and determining a corresponding camera feature.

In one embodiment the controller is further configured to h2) perform final object detection for not-selected region(s) while performing any of, a combination of or all of
- d) determining a photographic feature for the selected region;
- e) causing a re-capture of the selected region based on the photographic feature by updating an image capturing device;
- f) re-processing the re-captured region; and
- g) re-generating classification data.

In one embodiment the controller is further configured to b) prioritize a region based on one or several of the following heuristics:
- low confidence;
- classification type;
- object(s) detected in adjacent or close region;
- eye gaze;
- the region being previously selected;
- object density.

In one embodiment the controller is further configured to determine that the photographic shortcoming and the corresponding camera feature is one or several taken from the group comprising:
- low contrast—changing exposure
- under exposed—changing (increasing) exposure;
- over exposed—changing (reducing) exposure;
- not enough detail—zooming in;
- out of focus—re-focusing; and
- blurry—changing exposure (prioritizing a shorter exposure time).

In one embodiment the object detection device is a smartphone or a tablet computer.

In one embodiment the object detection device is an optical see-through device (100).

In one embodiment the object detection device is arranged to be used in image retrieval, industrial use, robotic vision and/or video surveillance.

According to one aspect a method for use in an object detection device is provided, the method being for providing object detection, wherein the method comprises:
- a) receiving classification data and regions for an image;
- b) prioritizing the regions;
- c) determining if a region is selected for further prediction; and if so
  - d) determining a photographic feature for the selected region;
  - e) causing a re-capture of the selected region based on the photographic feature by updating an image capturing device;
  - f) re-processing the re-captured region; and
  - g) re-generating classification data; and further
  - h1) performing final object detection for selected region(s) and
  - h2) performing final object detection for not-selected region(s).

According to one aspect there is provided a computer-readable medium carrying computer instructions that when loaded into and executed by a controller of an object detection device enables the viewing device to implement a method according to herein.

According to one aspect there is provided a software component arrangement for detecting objects in an object detection device comprising an image capturing device, wherein the software component arrangement comprises:
- a) a software component for receiving classification data and regions for an image;
- b) a software component for prioritizing the regions;
- c) a software component for determining if a region is selected for further prediction; and if so
  - d) a software component for determining a photographic feature for the selected region;
  - e) a software component for causing a re-capture of the selected region based on the photographic feature by updating an image capturing device;
  - f) a software component for re-processing the re-captured region; and
  - g) a software component for re-generating classification data; and further
  - h1) a software component for performing final object detection for selected region(s) and
  - h2) a software component for performing final object detection for not-selected region(s).

Further embodiments and advantages of the present invention will be given in the detailed description. It should be noted that although this application focus will be on object detection in mixed or augmented reality systems the teachings herein also find use in object detection and object detection devices in many areas of computer vision, including image retrieval, industrial use, robotic vision and video surveillance.

BRIEF DESCRIPTION OF THE DRAWINGS

Embodiments of the invention will be described in the following, reference being made to the appended drawings which illustrate non-limiting examples of how the inventive concept can be reduced into practice.

FIG. 13 shows a schematic view of an object detection device according to an embodiment of the present invention;

DETAILED DESCRIPTION

Figure 1A:
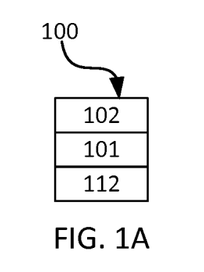
FIG. 1A shows a schematic view of an object detection device according to an embodiment of the present invention.

FIG. 1A shows a schematic view of an object detection device 100 according to an embodiment of the present invention. The object detection device comprises a controller 101, an image capturing device 112, such as a camera or image sensor, and a memory 102. The controller 101 is configured to receive at least one image, or at least a portion of an image from the image capturing device 112, and to perform object detection on the received (portion of the) image. The image capturing device 112 may be comprised in the object detection device 100 by being housed in a same housing as the object detection device, or by being connected to it, by a wired connection or wirelessly.

The controller 101 is also configured to control the overall operation of the object detection device 100. In one embodiment, the controller 101 is a graphics controller. In one embodiment, the controller 101 is a general purpose controller. In one embodiment, the controller 101 is a combination of a graphics controller and a general purpose controller. As a skilled person would understand there are many alternatives for how to implement a controller, such as using Field Programmable Gate Arrays circuits, AISIC, GPU, etc in addition or as an alternative. For the purpose of this application, all such possibilities and alternatives will be referred to simply as the controller 101.

The memory 102 is configured to store graphics data and computer-readable instructions that when loaded into the controller 101 indicates how the object detection device 100 is to be controlled. The memory 102 may comprise several memory units or devices, but they will be perceived as being part of the same overall memory 102. There may be one memory unit for a display arrangement storing graphics data, one memory unit for image capturing device storing settings, one memory for the communications interface (see below) for storing settings, and so on. As a skilled person would understand there are many possibilities of how to select where data should be stored and a general memory 102 for the object detection device 100 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 102.

Figure 1B:
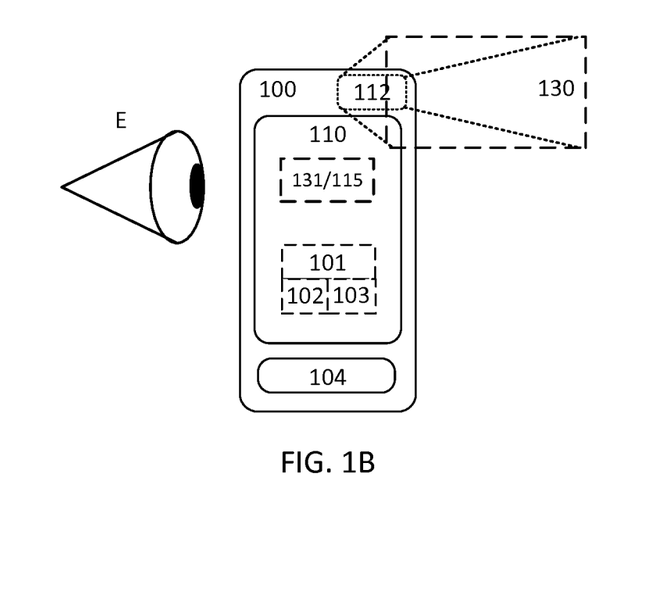

It should be noted that although this application focus will be on object detection in mixed or augmented reality systems, such as using the object detection devices of FIGS. 13 and 1C described below, the teachings herein also find use in object detection and object detection devices in many areas of computer vision, including image retrieval, industrial use, robotic vision and video surveillance where a basic object detection device 100 such as in FIG. 1A may be utilized.

FIG. 13 shows a schematic view of an object detection device being a viewing device 100 according to an embodiment of the present invention. In this embodiment, the viewing device 100 is a smartphone or a tablet computer. In such an embodiment, the viewing device further comprises a display arrangement 110, which may be a touch display, and the image capturing device 112 may be a camera of the smartphone or tablet computer. In such an embodiment the controller 101 is configured to receive an image from the camera 112, detect objects in the image and display the image on the display arrangement 110 along with virtual content indicating or being associated with the detected object(s). In the example embodiment of FIG. 1B, the camera 112 is arranged on a backside (opposite side of the display 110, as is indicated by the dotted contour of the camera 112) of the object detection device 100 for enabling real life objects 130 behind the object detection device 100 to be captured and shown to a user (represented by the eye E in FIG. 1B) on the display 110 as displayed objects 131 along with any displayed virtual content 115. The displayed virtual content may be information and/or graphics indicating and/or giving information on detected objects.

Figure 1C:
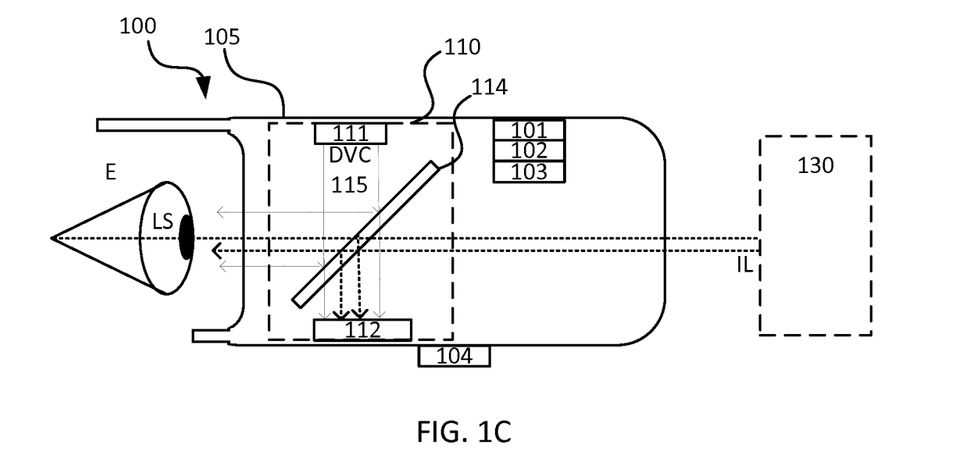
FIG. 1C shows a schematic view of an object detection device according to an embodiment of the present invention.

FIG. 1C shows a schematic view of an object detection device being an optical see-through (OST) viewing device 100 according to an embodiment of the present invention. The viewing device 100 is a see-through device, where a user looks in through one end, and sees the real-life objects (RLO) in the line of sight (indicated LS in FIG. 1C) at the other end of the viewing device 100.

In one embodiment the viewing device 100 is a head-mounted viewing device (HMD) 100 to be worn by a user (not shown explicitly but represented by the eye E in FIG. 1C) for looking through the viewing device 100. In one such embodiment the viewing device 100 is arranged as glasses, or other eye wear including goggles, to be worn by a user.

The viewing device 100 is in one embodiment arranged to be hand-held, whereby a user can hold up the viewing device 100 to look through it.

The viewing device 100 is in one embodiment arranged to be mounted on for example a tripod, whereby a user can mount the viewing device 100 in a convenient arrangement for looking through it. In one such embodiment, the viewing device 100 may be mounted on a dashboard of a car or other vehicle.

The viewing device comprises a housing 105, a display arrangement 110 for presenting virtual content to a viewer and an image capturing device 112 for identifying or detecting objects. As disclosed above with reference to FIG. 1A, the image capturing device 112 may be remote and comprised in the object detection device through a connection to the object detection device 100. It should also be noted that there may be more than one image capturing device 112 comprised in the object detection device 100. For example, one camera may be used for providing the visual content to be displayed to a user, while a second camera may be used for object detection. As this application relates to the object detection, only the image capturing device concerned with object detection is discussed.

In one embodiment, the viewing device 100 comprises transparent display arrangement 110. The display arrangement 110, is self-illuminating, and is therefore configured to be capable of displaying content for example using a display device 111 such as a projector, a Liquid Cristal Display (LCD) or an Organic Light-Emitting Diode (OLED) display. The following examples will be given assuming a projector is used, but it should be noted that this is only one possible alternative. The display arrangement 110 is arranged in the housing 105 so that a visual object VO may be perceived along the line of sight, indicated LS in the figure, or field of view of an eye E looking through the viewing device 100.

The display arrangement 110 is configured to display virtual content DVC to be viewed by the user. As the display arrangement 110 is transparent, the displayed virtual content DVC will be perceived by a user as overlapping any visual real life objects RLOs viewed through the viewing device 100. The viewing device 100 is thus suitable for use with augmented reality, mixed reality and extended reality systems. For the purpose of this application, augmented reality AR will be considered to be the equivalent and interchangeable with the terminologies of mixed reality and extended reality. Further references will simply be to Augmented Reality (AR), but applies equally to mixed or extended reality.

Figure 2:
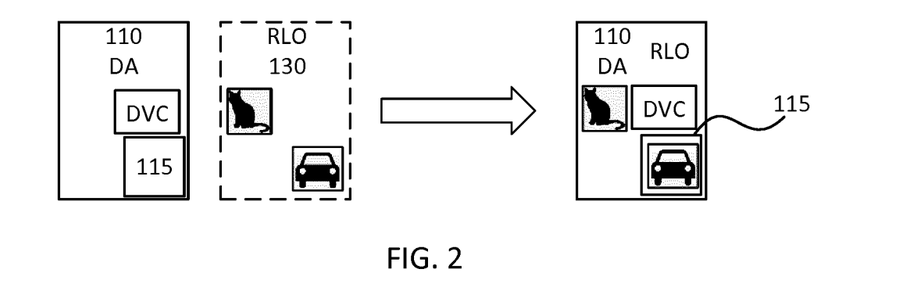
FIG. 2 shows a schematic view of the operation of a viewing device according to one embodiment of the teachings herein.

An example view of how the virtual content is displayed to overlap the real life objects RLOs 130 is shown in FIG. 2, which shows a schematic view of an exemplary view seen through the viewing device 100. On the left of the figure, there is shown the display arrangement 110 and the displayed virtual content DVC being displayed on the display arrangement 110 and also the current field of view 130 (dashed rectangle) with the visual real life objects RLOs currently viewable. In this example view, the real life objects RLOs are exemplified as a box showing a cat and a box showing a car. On the right of the figure, the composite or combination of the two views is shown, i.e. the view actually seen by the user through the viewing device 100. As can be seen, the displayed virtual content DVC, also referenced 115 in the figures, is perceived as overlapping the real life objects RLOs thereby providing an augmented reality.

As stated above, the viewing device 100 also comprises an image capturing device 112. The image capturing device 112 is arranged where it can capture an image (still or video stream) of the view seen by the user. The exact placement of the image capturing device 112 depends on the current display arrangement and design options, but is illustrated in FIG. 1C to be substantially opposite the display device 111. In one embodiment the image capturing device 112 is arranged next to or adjacent the display device 111. In one embodiment the image capturing device 112 is arranged next to or adjacent the user's Eye. For the purpose of this application, 'adjacent' (to an entity) is seen as 'to be next to' (the entity) and/or 'within a distance' (to the entity).

In one embodiment the display arrangement 110 of the object detection device 100 comprises a display device 111 (such as a projector device) and a partially transparent reflective device 114, such as a mirror 114. Examples of display devices 111 are, but not restricted to, a DLP (Digital Light Processing) projector, an LCD (Liquid Cristal Display), an LED (Light Emitting Diode) or OLED (Organic Light Emitting Diode) display. The display device 111 is arranged to project the content to be displayed DVC also referenced 115 onto the partially transparent reflective device 114. The partially transparent reflective device 114 is arranged to reflect the displayed virtual content DVC to a user and to enable real life objects RLOs to be perceivable through the partially transparent reflective device. The user will thereby perceive the displayed virtual content DVC as overlapping the RLOs. In one embodiment, the reflective device 114 is arranged at an angle of 45 degrees relative the line of sight of the user, and/or, alternatively or additionally, relative the display device 111.

The image capturing device 112 of the display arrangement 110 is arranged opposite the display device 111, i.e. on the other side of the reflective device 114. As noted above, the image capturing device 112 may also be arranged adjacent the user's eye or adjacent the display device 111, i.e. on the same side of the reflective device 114 as the projector. Arranging the image capturing device 112 adjacent to the display device 111 or adjacent to the eye provides a simpler or smaller housing 105, as no underside of the housing is technically needed or at least can be made smaller. Arranging the image capturing device 112 on the opposite side of the reflective device 114 provides for a higher degree of freedom of movement for the image capturing device 112, thereby providing a more efficient calibration.

In the following, simultaneous reference will be made to the object detection devices 100 of FIGS. 1A, 1B and 1C.

In one embodiment the object detection device 100 further comprises a communication interface 103. The communication interface may be wired and/or wireless. The communication interface may comprise several interfaces.

In one embodiment the communication interface comprises a USB (Universal Serial Bus) interface. In one embodiment the communication interface comprises a HDMI (High Definition Multimedia Interface) interface. In one embodiment the communication interface comprises a Display Port interface. In one embodiment the communication interface comprises an Ethernet interface. In one embodiment the communication interface comprises a MIPI (Mobile Industry Processor Interface) interface. In one embodiment the communication interface comprises an analog interface, a CAN (Controller Area Network) bus interface, an I2C (Inter-Integrated Circuit) interface, or other interface.

In one embodiment the communication interface comprises a radio frequency (RF) communications interface. In one such embodiment the communication interface comprises a Bluetooth™ interface, a WiFi™ interface, a ZigBee™ interface, a RFID™ (Radio frequency IDentifier) interface, Wireless Display (WiDi) interface, Miracast interface, and/or other RF interface commonly used for short range RF communication. In an alternative or supplemental such embodiment the communication interface comprises a cellular communications interface such as a fifth generation (5G) cellular communication interface, an LTE (Long Term Evolution) interface, a GSM (Global Systéme Mobilé) interface and/or other interface commonly used for cellular communication. In one embodiment the communications interface is configured to communicate using the UPnP (Universal Plug n Play) protocol. In one embodiment the communications interface is configured to communicate using the DLNA (Digital Living Network Appliance) protocol.

In one embodiment, the communications interface 103 is configured to enable communication through more than one of the example technologies given above. As an example, a wired interface, such as MIPI could be used for establishing an interface between the display arrangement, the controller and the user interface, and a wireless interface, for example WiFi™ could be used to enable communication between the object detection device 100 and an external host device (not shown).

The communications interface 103 is configured to enable the object detection device 100 to receive and/or transmit data and/or instructions regarding the virtual content to be displayed. The communications interface 103 may also be configured to enable the object detection device 100 to communicate with other devices, such as other object detection devices 100 and/or smartphones, Internet tablets, computer tablets or other computers, media devices, such as television sets, gaming consoles, video viewer or projectors (not shown).

A user interface 104 may be comprised in the object detection device. Additionally or alternatively, (at least a part of) the user interface 104 may be comprised remotely in the object detection device 100 through the communication interface 103, the user interface then (at least a part of it) not being a physical means in the object detection device 100, but implemented by receiving user input through a remote device (not shown) through the communication interface 103. One example of such a remote device is a game controller, a mobile phone handset, a tablet computer or a computer.

Figure 3:
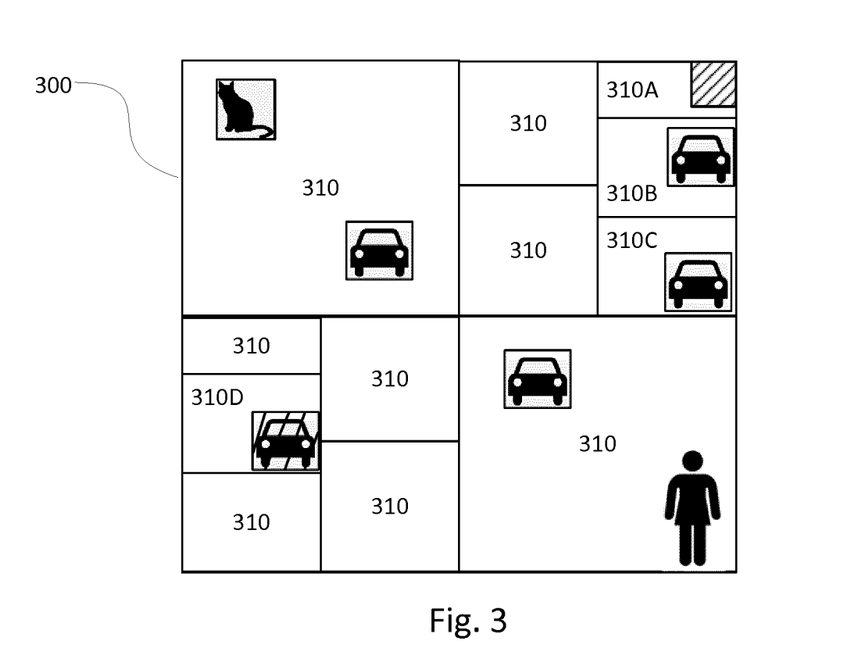
FIG. 3 shows a view of an image and its partitions according to an embodiment of the present invention.

FIG. 3 shows a schematic view of how a captured image 300, or rather the data representing the captured image, is portioned into regions 310. A region may be a macro-block or a partition, depending on what coding scheme is used, if a coding scheme is used. A region is identified by its location (such as its coordinates) in the image 300. As can be seen in FIG. 3, the image 300 comprises one or more objects, here indicated by 5 cars, a cat and a woman, but it should be noted that the type of objects to be detected can be basically anything and are not restricted to cars.

Figure 4:
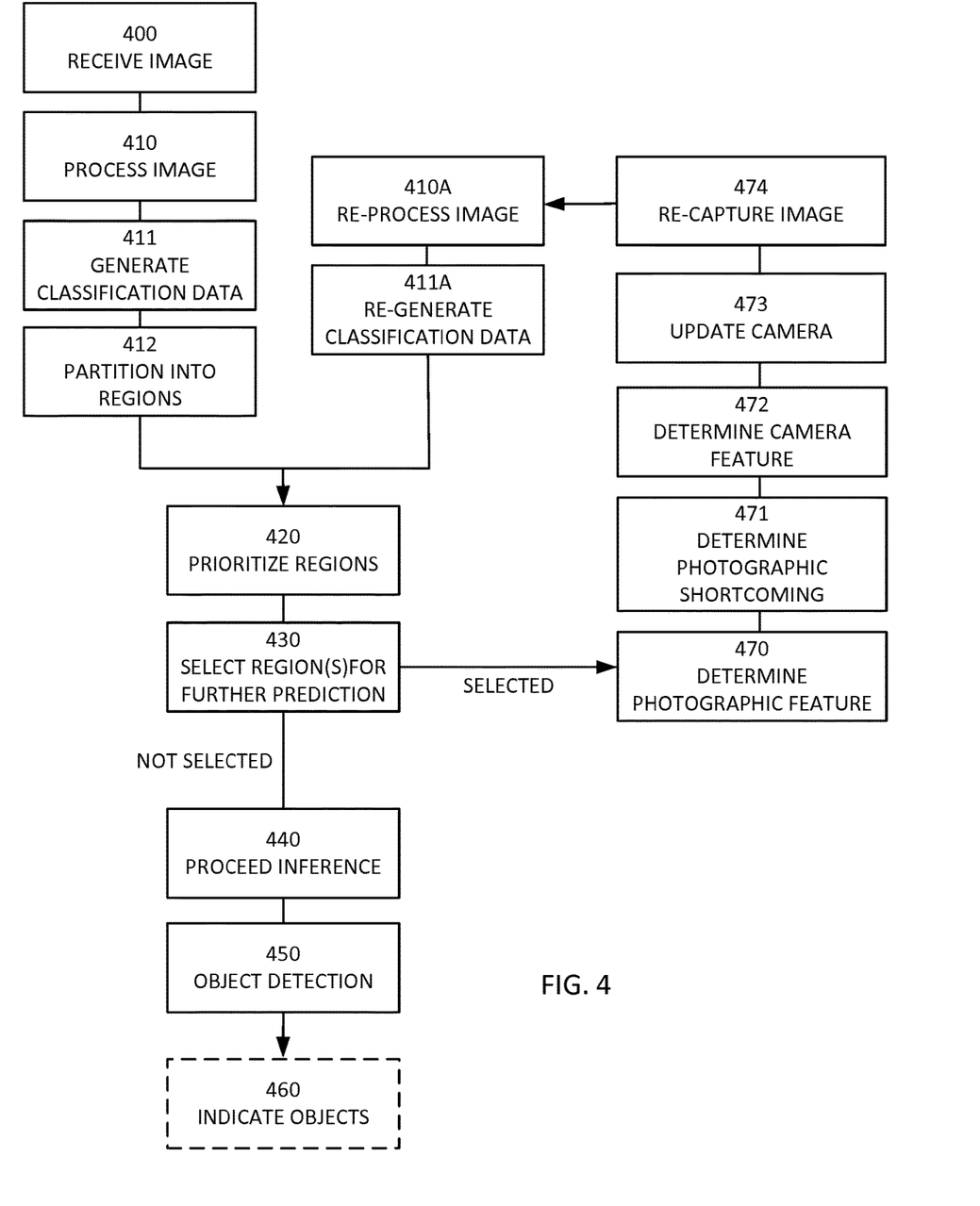
FIG. 4 shows a flowchart of a general method according to an embodiment of the present invention.

FIG. 4 shows a flowchart of a general method according to an embodiment of the teachings herein. The method utilizes an object detection device 100 as taught herein. In one embodiment, the object detection device is configured to perform the object detection utilizing an object detection model based on Machine Learning.

In some embodiments, the object detection device is configured to perform the object detection utilizing an object detection model based on Deep Neural Networks. The description given herein will focus on such embodiments.

Before the teachings herein may be applied, an image is received 400 by the controller 101 from the image capturing device 112 and the controller 101 performs a processing 410 of the image where the classification data for the image is generated 411 and where the image is partitioned 412 into regions 310.

The image may be part of a series of images, i.e. a video clip and the format could be either raw or compressed.

In one embodiment, the image is pre-processed/manipulated (such as augmented, down-sampled, filtered, . . . ) to be provided in a suitable format to be processed by the object detection model used.

The classification data is generated by the controller performing regression analysis, object classification and filtering on the image (data) and the classification data generated includes, but is not limited to classification candidates, coordinates for the classification candidates and confidence values for the regions. The confidence values indicating the confidence of any classification made in the region, a high confidence indicating a high likelihood that the classification is correct. A low confidence may be given if the region is out of focus, poorly lit, has low contrast, is blurry or is otherwise of a low visual quality.

It should be noted that the generation of the classification data and partition into regions may be performed by a different (possibly remote) controller, such as part of the camera, another object detection device or another application, whereby the classification data and the regions are received by the controller 101 of the object detection device 100.

Next, the controller 101 prioritizes 420 the regions and performs 430 a selection of regions for further prediction based on the prioritization. The prioritization enables the object detection device to save power and reduce latency by only performing the most needed further predictions. The prioritization is based on one or several of the following heuristics:

low confidence, a low confidence will need further prediction;
classification type, classification types with high importance are prioritized;
object(s) detected in adjacent or close region, indicating that there is a high likelihood of object also in the current region;
eye gaze, a region looked at frequently or for a long time is probably of special interest and should receive a further prediction;
previously selected, a region that has previously been selected will have to be very important to be selected again as maybe that region is simply not possible to obtain good quality image data for;
object density: the cumulative class probabilities for all classes vs. probability of background.

The heuristics may be combined in a weighted sum, they may be determined individually or some may be determined in combination and some individually, possibly overlapping. As a skilled person would understand, other heuristics are also possible to base the prioritization on. The selection for further prediction is made of the region(s) with a high priority. In one embodiment, the regions with a priority exceeding a threshold limit are selected. In one embodiment, the threshold limit is absolute. In one embodiment, the threshold limit is relative, for example the top 20, 15, 10, 5% or any interval therein. In one embodiment, the threshold limit is static. In one embodiment, the threshold limit is dynamic and is adapted depending on circumstances. For example if it is noted that too many regions are selected at every image, the threshold limit may be adapted so as to reduce the number of selected regions, thereby reducing the needed computational resources. Alternatively or additionally the prioritization may be changed, a higher prioritization corresponding to a lowering in threshold and vice-versa.

Returning to FIG. 3, some examples are shown. For example, the region marked 310A may be selected for further prediction even if it is not possible to detect any candidate object in it, based on that there are detected objects (cars) in the adjacent region 31013 as well as in the close region 310C indicating a pattern of objects (cars) in the vicinity. Another example is given in region indicated 310D where an object is detected, but is too dark to be properly classified with any high confidence as a car (indicated by the dashes over the object).

As the selection has been made, the controller proceeds 440 with any remaining inference steps for the regions not selected. As the remaining inference (and any other image processing) is done, the controller performs the final prediction and objects are detected 450 and possibly indicated 460 to a user. It should be noted that the object detection device does not need to deliver the final result of a viewable image, but may be a device part of a longer pipeline for providing a viewable image, and the final prediction may be delivered to a software client, a further device, a memory for future reference, or an application. As stated above, the teachings herein does not only find use in virtual or augmented reality, but also find use in many areas of computer vision, including image retrieval, industrial use, robotic vision and video surveillance.

In one embodiment, the regions that are not selected are proceeded with after the selection. This allows for a more efficient use of time whereby the resulting image will be updated as more and more regions are properly inferred.

In one embodiment, all regions are held back until no more regions are selected for further prediction. This allows for a smoother viewing as the displayed image or rather the object(s) detected is not updated.

For the regions that are selected, the controller 101 determines 470 a photographic feature of the selected region 310. The photographic feature is determined based on the image data and the classification data for that region and is chosen so that the confidence level for that region may be increased, by determining 471 a photographic shortcoming of the region and selecting 472 a corresponding camera feature for compensating the photographic shortcoming.

In one embodiment the controller 101 is configured to determine that the photographic shortcoming is that the region 310 is out of focus, and in response thereto select the camera feature to (re-)focus on that region 310.

In one embodiment the controller 101 is configured to determine that the photographic shortcoming is that the region 310 is improperly exposed (too dark/too bright), and in response thereto select the camera feature of a proper exposure for that region 310 (under exposed increasing exposure, over exposed reducing exposure).

In one embodiment the controller 101 is configured to determine that the photographic shortcoming is that the region 310 is without contrast, and in response thereto select the camera feature of a proper exposure of that region 310.

In one embodiment the controller 101 is configured to determine that the photographic shortcoming is that the region 310 is blurry, and in response thereto select the camera feature of an appropriate exposure, prioritizing a shorter exposure time, of that region 310.

In one embodiment the controller 101 is configured to determine that the photographic shortcoming is that the classification data indicates an object too small to detect in that region 310, and in response thereto select the camera feature of zooming in on that region 310.

Returning to the examples of FIG. 3; for the region indicate 310A selected based on the likelihood of an object appearing being high as objects are present in adjacent or close regions, the photographic shortcoming may be that there is not enough data present and the selected camera feature may be to zoom in on the region to enable for a better object detection. Likewise, for the region indicated 310D selected based on that the candidate object is too dark to be properly classified, the photographic shortcoming may be that there is not enough light and the selected camera feature may be to adapt the exposure for the region to enable for a better object detection.

As an appropriate camera feature has been selected for a region (or for several regions) the controller 101 is configured to update 473 the image capturing device 112 according to the determined photographic feature using the selected camera feature(s) and cause the image capturing device 112 to recapture 474 the image. In one embodiment the controller is configured to select a camera feature for several regions. As many regions may suffer from the same photographic shortcoming, or photographic shortcomings that may be overcome in the same manner (by using similar camera features), computational resources may be reduced, if more than one region is recaptured at the same time. In an embodiment, where the image capturing device 112 is remote to the object detection device, the controller 101 transmits the selected region or rather data indicating the elected region along with parameters for the selected camera feature (or alternatively, the photographic shortcoming) for causing the remote image capturing device to be updated and recapture the image.

The controller 101 then re-processes 410A the image, generating new classification data 411A. In one embodiment only the selected regions are re-processed. In one embodiment, the new classification data may be combined with the classification data previously received for that region. This may be done before or after (or both) the reprocessing of the region. By combining the new and the old classification data, an improved classification may be achieved. By utilizing the old classification data before regenerating the new classification data, an improved classification may be achieved as the classification will be given hints as what to look for based on the old classification data.

The selected regions are then subjected to the proceeded inference as for the not selected regions.

In one embodiment, the re-processed regions are re-prioritized based on the new classification data, whereby some regions may be selected for even further prediction.

The inventors have brilliantly realized that as the regions are re-captured and not only reanalyzed, the regions that have a low confidence may be recaptured completely overcoming basically any shortcoming that would be impossible to overcome using software filters/analysis tools. And, as the camera settings are changed there will be no (or at least reduced) need for software manipulation of the image, thereby reducing the computational resources needed. Performing advanced software manipulation or analysis (i.e. filtering) of an image requires far more resources than recapturing an image that needs no or little filtering.

Figure 5:
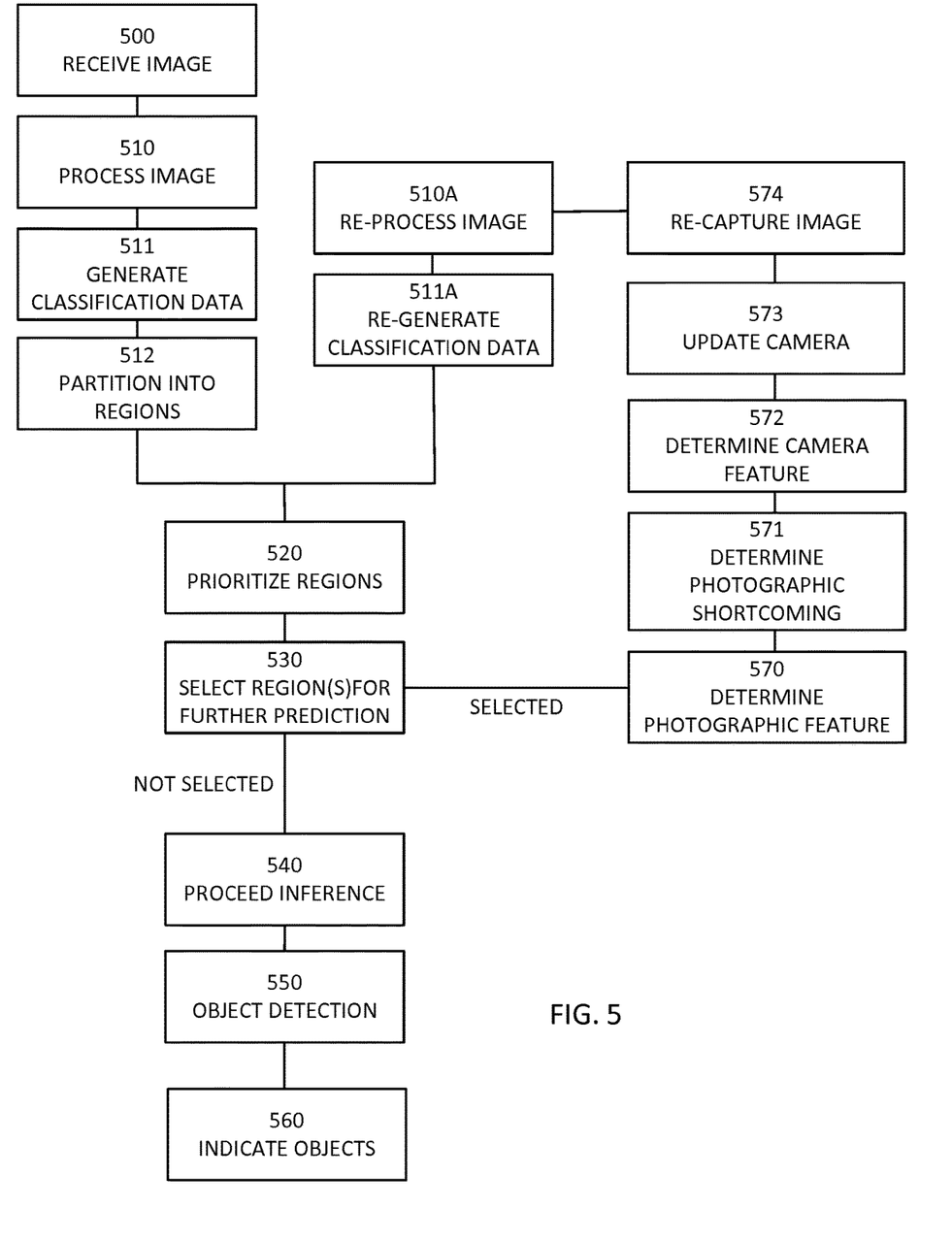
FIG. 5 shows a component view for a software component arrangement according to an embodiment of the teachings herein.

FIG. 5 shows a component view for a software component arrangement 500 according to an embodiment of the teachings herein. The software component arrangement 500 is adapted to be used in an object detection device 100 as taught herein for providing object detection.

The software component arrangement 500 of FIG. 5 comprises a software component for receiving 500 an image from the image capturing device 112 and a software component for performing a processing 510 of the image comprising a software component for generating 511 classification data for the image 300 and a software component for partitioning 512 the image 300 into regions 310.

The software component arrangement 500 of FIG. 5 further comprises a software component for prioritizing 520 the regions and a software component for performing 530 a selection of regions for further prediction based on the prioritization.

The software component arrangement 500 of FIG. 5 further comprises a software component for determining 570 a photographic feature of the regions 310 that are selected. The software component for determining photographic feature comprises a software component for determining 571 a photographic shortcoming of the region and a software component for selecting 572 a corresponding camera feature for compensating the photographic shortcoming.

The software component arrangement 500 of FIG. 5 further comprises a software component for updating 573 the image capturing device 112 according to the determined photographic feature, as an appropriate camera feature has been selected for a region (or for several regions), using the selected camera feature(s) and a software component for causing the image capturing device 112 to recapture 574 the image. In one embodiment the software component arrangement 500 of FIG. 5 further comprises a software component for selecting a camera feature for several regions. As many regions may suffer from the same photographic shortcoming, or photographic shortcomings that may be overcome in the same manner (by using similar camera features), computational resources may be reduced, if more than one region is recaptured at the same time. In an embodiment, where the image capturing device 112 is remote to the object detection device, the software component arrangement 500 of FIG. 5 further comprises a software component for transmitting the selected region or rather data indicating the elected region along with parameters for the selected camera feature (or alternatively, the photographic shortcoming) for causing the remote image capturing device to be updated and recapture the image.

The software component arrangement 500 of FIG. 5 further comprises a software component for re-processing 510A the image and a software component for generating new classification data 511A.

The software component arrangement 500 of FIG. 5 further comprises a software component for proceeding 540 with any remaining inference steps for regions, a software component for performing the final prediction and objects are detected 550 and possibly a software component for indicating 560 the detected object to a user.

Figure 6:
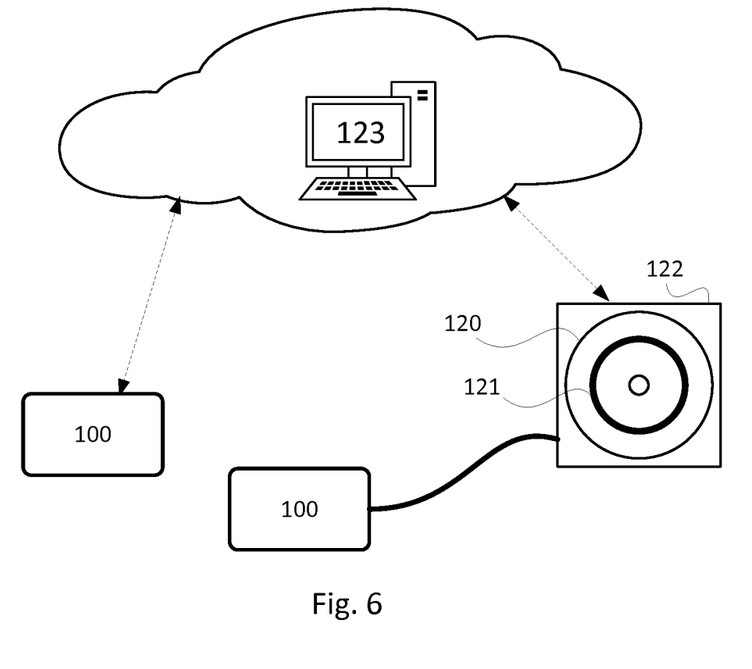
FIG. 6 shows a schematic view of a computer-readable medium carrying computer instructions that when loaded into and executed by a controller of a viewing device enables the viewing device to implement an embodiment of the present invention.

FIG. 6 shows a schematic view of a computer-readable medium 120 carrying computer instructions 121 that when loaded into and executed by a controller of an object detection device 100 enables the object detection device 100 to implement the present invention.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 6, a computer-readable medium 120 is shown as being a computer disc 120 carrying computer-readable computer instructions 121, being inserted in a computer disc reader 122. The computer disc reader 122 may be part of a cloud server 123 or other server or the computer disc reader may be connected to a cloud server 123 or other server. The cloud server 123 may be part of the internet or at least connected to the internet. The cloud server 123 may alternatively be connected through a proprietary or dedicated connection. In one example embodiment, the computer instructions are stored at a remote server 123 and be downloaded to the memory 102 of the object detection device 100 for being executed by the controller 101.

The computer disc reader 122 may also or alternatively be connected to (or possibly inserted into) an object detection device 100 for transferring the computer-readable computer instructions 121 to a controller of the object detection device (presumably via a memory of the object detection device 100).

FIG. 6 shows both the situation when an object detection device 100 receives the computer-readable computer instructions 121 via a server connection and the situation when another object detection device 100 receives the computer-readable computer instructions 121 through a wired interface. This enables for computer-readable computer instructions 121 being downloaded into an object detection device 100 thereby enabling the object detection device 100 to operate according to and implement the invention as disclosed herein.

The invention claimed is:

1. An object detection device comprising a controller configured to:
    a) receive image data produced by an image capturing device and process the image data, wherein the image data represents an image and wherein processing the image data comprises generating classification data and partitioning the image data into regions;
    b) prioritize one or more of the regions based on heuristics that comprise one or more of:
        low classification confidence;
        classification type;
        object(s) detected in an adjacent or close region;
        a detected eye gaze;
        said one or more of the regions being previously selected; and
        object density;
    c) determine that a region is selected for further classification processing if the region has a priority exceeding a threshold limit; and when the region is selected for further classification processing:
    d) determine a photographic feature for the selected region;
    e) update an image capturing device to adjust the photographic feature for the selected region and cause the updated image capturing device to perform a re-capture of the selected region;
    f) re-process the re-captured region; and thereby
    g) re-generate classification data; and then
    h1) perform final object detection for selected region(s) based on the re-generated classification data; and
    h2) perform final object detection for not-selected region(s) based on the classification data.

2. The object detection device according to claim 1, wherein the controller is further configured to perform object detection for the image utilizing an object detection model.

3. The object detection device according to claim 2, wherein the object detection model is based on a Deep Neural Network model.

4. The object detection device according to claim 1, wherein the controller is further configured to determine the photographic feature by determining a photographic shortcoming of the region and determining a corresponding camera feature.

5. The object detection device according to claim 1, further comprising the image capturing device, wherein the controller is further configured to e) cause the re-capture of the selected region based on the photographic feature by recapturing the selected region in a re-captured image.

6. The object detection device according to claim 1, wherein the controller is further configured to perform final object detection for a region by proceeding with inference and making final predictions.

7. The object detection device according to claim 1, wherein the controller is further configured to h2) perform final object detection for not-selected region(s) when no more regions are selected for further prediction.

8. The object detection device according to claim 1, wherein the controller is further configured to h2) perform final object detection for not-selected region(s) while performing any of, a combination of or all of:
    d) determining a photographic feature for the selected region;
    e) causing a re-capture of the selected region based on the photographic feature by updating the image capturing device;
    f) re-processing the re-captured region; and
    g) re-generating classification data.

9. The object detection device according to claim 4, wherein the controller is further configured to determine that the photographic shortcoming and the corresponding camera feature is one or several taken from the group comprising:
    low contrast—changing exposure;
    under exposed—changing exposure;
    over exposed—changing exposure;
    not enough detail—zooming in;
    out of focus—re-focusing; and
    blurry—changing exposure.

10. The object detection device according to claim 1, wherein the controller is further configured to g) re-generate classification data based on received classification data for that region.

11. The object detection device according to claim 1, wherein the threshold limit is absolute.

12. The object detection device according to claim 1, wherein the threshold limit is relative.

13. The object detection device according to claim 1, wherein causing the updated image capturing device to perform a re-capture of the selected region comprises causing a re-capture of several regions in one re-capture.

14. The object detection device according to claim 1, wherein the object detection device is a smartphone or a tablet computer.

15. The object detection device according to claim 1, wherein the object detection device is an optical see-through device.

16. The object detection device according to claim 1, wherein the object detection device is arranged to be used in image retrieval, industrial use, robotic vision and/or video surveillance.

17. A method for object detection in an object detection device, wherein the method comprises:
 a) receiving image data produced by an image capturing device and process the image data, wherein the image data represents an image and wherein processing the image data comprises generating classification data and partitioning the image data into regions;
 b) prioritizing one or more of the regions based on heuristics that comprise one or more of:
  low classification confidence;
  classification type;
  object(s) detected in an adjacent or close region;
  a detected eye gaze;
  said one or more of the regions being previously selected; and
  object density;
 c) determining that a region is selected for further classification processing if the region has a priority exceeding a threshold limit; and when the region is selected for further classification processing:
 d) determining a photographic feature for the selected region;
 e) updating an image capturing device to adjust the photographic feature for the selected region and causing the updated image capturing device to perform a re-capture of the selected region;
 f) re-processing the re-captured region; and thereby
 g) re-generating classification data; and then
 h1) performing final object detection for selected region(s) based on the re-generated classification data; and
 h2) performing final object detection for not-selected region(s) based on the classification data.

18. A non-transitory computer-readable medium carrying computer instructions that when loaded into and executed by a controller of an object detection device enables the object detection device to implement a method for object detection in an object detection device, wherein the method comprises:
 a) receiving image data produced by an image capturing device and process the image data, wherein the image data represents an image and wherein processing the image data comprises generating classification data and partitioning the image data into regions;
 b) prioritizing one or more of the regions based on heuristics that comprise one or more of:
  low classification confidence;
  classification type;
  object(s) detected in an adjacent or close region;
  a detected eye gaze;
  said one or more of the regions being previously selected; and
  object density;
 c) determining that a region is selected for further classification processing if the region has a priority exceeding a threshold limit; and when the region is selected for further classification processing:
 d) determining a photographic feature for the selected region;
 e) updating an image capturing device to adjust the photographic feature for the selected region and causing the updated image capturing device to perform a re-capture of the selected region;
 f) re-processing the re-captured region; and thereby
 g) re-generating classification data; and then
 h1) performing final object detection for selected region(s) based on the re-generated classification data; and
 h2) performing final object detection for not-selected region(s) based on the classification data.

* * * * *